United States Patent
O'Connor et al.

(10) Patent No.: US 6,811,272 B2
(45) Date of Patent: Nov. 2, 2004

(54) POLARIZATION CONVERSION SYSTEM

(75) Inventors: Michael O'Connor, Cupertino, CA (US); Clark A. Pentico, Simi Valley, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/667,779

(22) Filed: Sep. 22, 2003

(65) Prior Publication Data

US 2004/0062024 A1 Apr. 1, 2004

Related U.S. Application Data

(62) Division of application No. 10/086,936, filed on Feb. 28, 2002, now abandoned.

(51) Int. Cl.[7] .................................................. F21V 9/14
(52) U.S. Cl. .......................... 362/19; 362/297; 359/483; 353/20
(58) Field of Search ........................... 362/19, 297, 298; 359/483, 485–487, 494; 353/20; 349/96, 98

(56) References Cited

U.S. PATENT DOCUMENTS

| | | | | |
|---|---|---|---|---|
| 5,618,102 A | * | 4/1997 | Ferrell | 362/516 |
| 6,080,980 A | * | 6/2000 | Steinle | 250/216 |
| 6,341,038 B1 | * | 1/2002 | Budd et al. | 359/487 |
| 6,362,920 B1 | * | 3/2002 | Hannah | 359/497 |

* cited by examiner

*Primary Examiner*—Alan Cariaso
*Assistant Examiner*—Ali Alavi
(74) *Attorney, Agent, or Firm*—Trop, Pruner & Hu, P.C.

(57) ABSTRACT

A reflector, light source, phase retarder, and linear polarizer configured to increase a single-polarization output beam by converting wrong-polarization light into correct-polarization light. The linear polarizer reflects the wrong-polarization light and transmits the correct-polarization light. The phase retarder converts the wrong-polarization light into correct-polarization light, which is then transmitted by the linear polarizer.

8 Claims, 6 Drawing Sheets

POLARIZATION CONVERSION SYSTEM

This is a divisional of prior application Ser. No. 10/086,936, filed Feb. 28, 2002 now abandoned.

BACKGROUND OF THE INVENTION

1. Technical Field of the Invention

The present invention relates generally to light projectors, and more specifically to a projector light source with an improved single-polarization output light beam.

2. Background Art

In many applications, it is advantageous to employ a light source providing a light beam of a single polarization. For example, when used with single-polarization light, spatial light modulators (SLMs) offer improved visual quality of their modulated light output. It has been common practice to obtain the single polarization by discarding light of the other polarization. This is undesirable for many reasons, such as reduced output intensity, increased power consumption, increased heat generation, and so forth.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
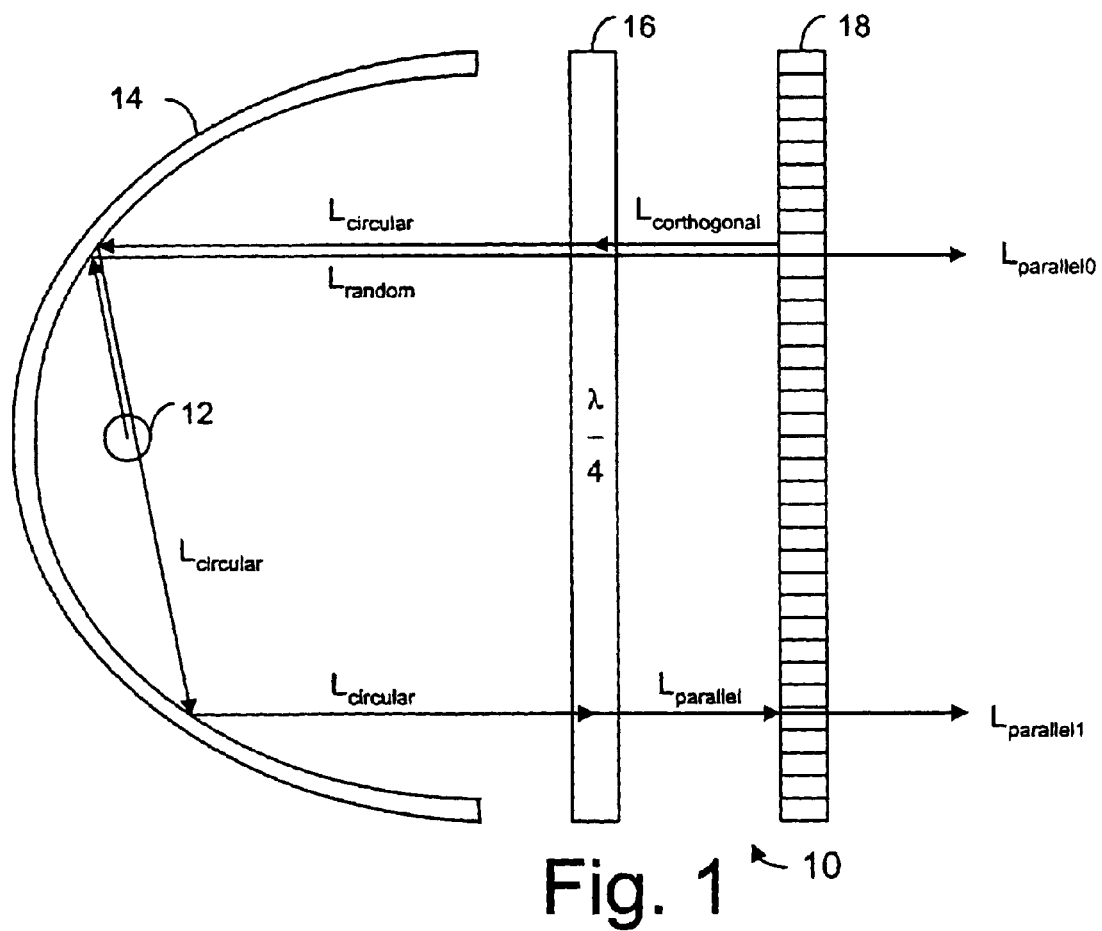
FIGS. 1–5 show various embodiments of a polarization conversion system according to this invention.

FIG. 1 illustrates one embodiment of a polarization conversion system 10, including a light source 12 such as an arc, a plasma lamp, or other suitable means. In many applications, it will be desirable that the light source generate a light beam having a small ètendue. The system further includes a reflector 14 shaped and positioned relative to the light source so to reflect the light beam into a substantially collaminated beam. The system further includes a quarter-wave phase retarder 16 ("λ/4") which rotates the polarization of the light passing through it by 45 degrees. The system also includes a linear polarizer 18 which transmits light of a first polarization and reflects light of another polarization. One embodiment of a suitable linear polarizer is an optical substrate with a micro-structured wire grid type polarizer surface.

Operation of the system will be explained with regard to light that is reflected by the reflector. The reader will understand that the same principles apply to light that travels directly from the light source to the polarizer without first being reflected by the reflector. The light emerges from the light source with a random polarization ($L_{random}$), is reflected by the reflector, passes through the quarter-wave phase retarder, and encounters the linear polarizer. Some of the light ($L_{parallel0}$) happens to be of the correct polarization, and is transmitted through the linear polarizer to emerge as a first component of the output beam.

Some of the light ($L_{orthogonal}$) is of the wrong polarization, and is reflected by the linear polarizer. It then passes back through the quarter-wave phase retarder, which rotates its polarization by 45 degrees, is reflected by the reflector, and passes again through the quarter-wave phase retarder, where its polarization is rotated by an additional 45 degrees. Now, when it encounters the linear polarizer, the light is of the correct polarization (having made two passes through the quarter-wave phase retarder, for a total of a half phase of polarization shift), and it emerges as a second component of the output beam ($L_{parallel1}$).

Unless ideal components can be utilized, there will be losses as the light beams traverse the system. The better the components, the lower the losses, and the greater contribution the second component ($L_{parallel1}$) makes to the overall brightness of the output beam.

One suitable linear polarizer is the ProFlux polarizer available from Moxtek, Inc, 452 W 1260 N, Orem, Utah 84057. Some details of the linear polarizer are shown in U.S. Pat. Nos. 6,108,131, 6,122,103, and 6,288,840. Additional information regarding such polarizers can be found at http://www.moxtek.com and http://www.profluxpolarizer.com.

Figure 2:
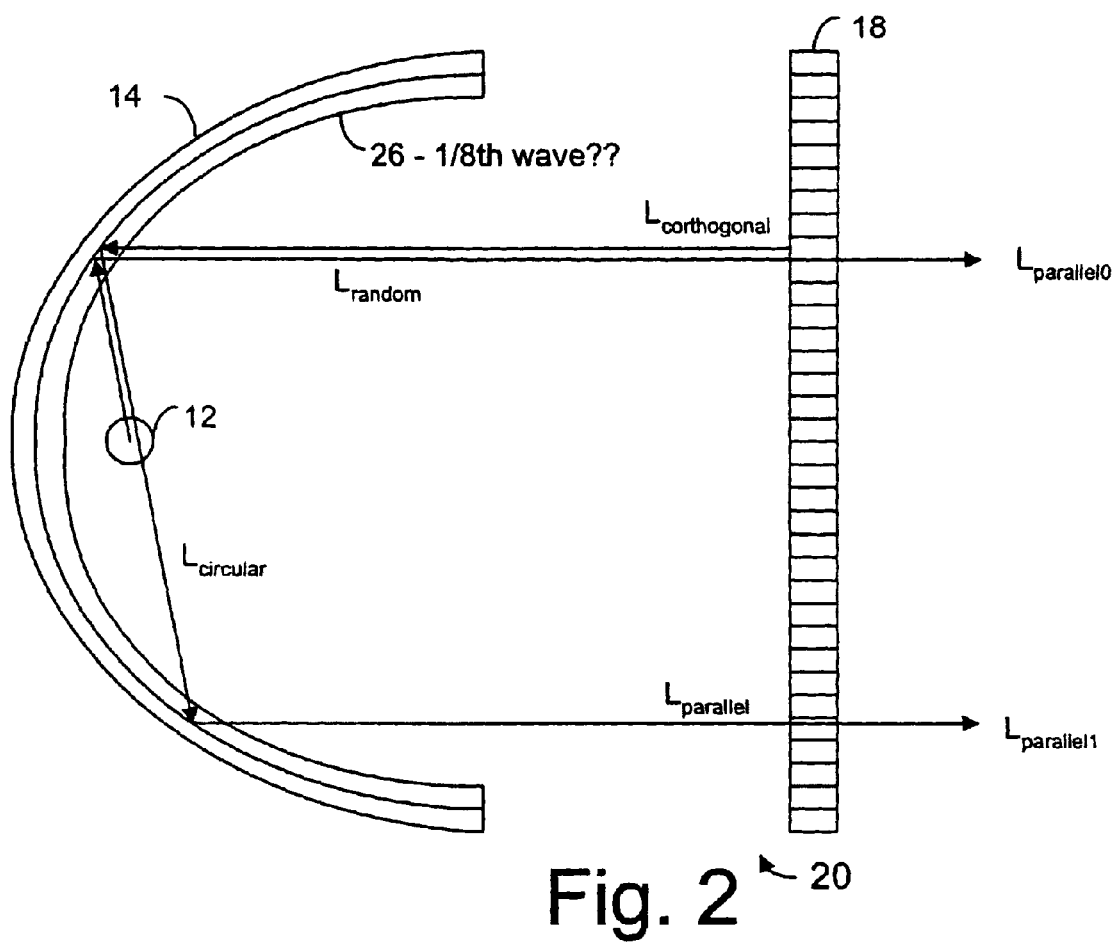

FIG. 2 shows a second embodiment 20 of a system utilizing this invention. It contains a light source 12, reflector 14, and linear polarizer 18 as in the first embodiment. However, the phase retarder 26 is layered on the reflector rather than being configured with the polarizer. The phase retarder coating causes a quarter-wave retardation when passed through twice (passing into, then reflected back out through). In some embodiments, this coating may retard differently in the two directions, and may retard differently depending upon the angle of incidence.

Figure 3:
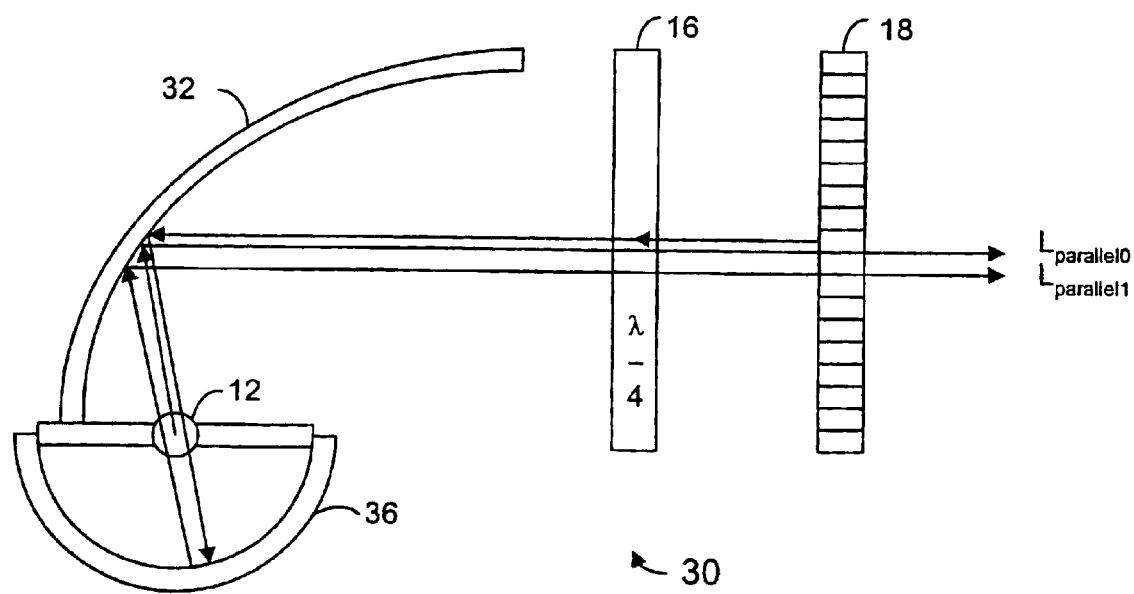

FIG. 3 illustrates a third embodiment of a polarization conversion system 30. It includes a light source 12, as well as a quarter-wave phase retarder 16 and a linear polarizer 18. The retarder and polarizer can, in this embodiment, be made approximately half the size they would be in the other embodiments, because the reflector 32 is approximately one half the size of the reflectors in the embodiments of FIGS. 1 and 2. The system further includes a reflector 36. The reflector 36 is substantially hemispherical, with a reflective concave surface.

Correct polarization light from the light source will be transmitted by the linear polarizer as a first component ($L_{parallel0}$) of the output beam. Light of the wrong polarization will be reflected by the polarizer, off the reflector 32, through the light source into the interior chamber of the reflector 36 combination. Eventually, it will bounce back through the light source, off the reflector 32, make another pass through the retarder, and be of the correct polarization when it arrives at the polarizer, from which it will emerge as a second component ($L_{parallel1}$) of the output beam. In some embodiments, the light will be re-emitted as randomly polarized light, rather than merely passing through as indicated above. The embodiment of FIG. 3 will, of course, generate a narrower output beam than those of FIG. 1 or 2, assuming the same general scale of components.

Figure 4:
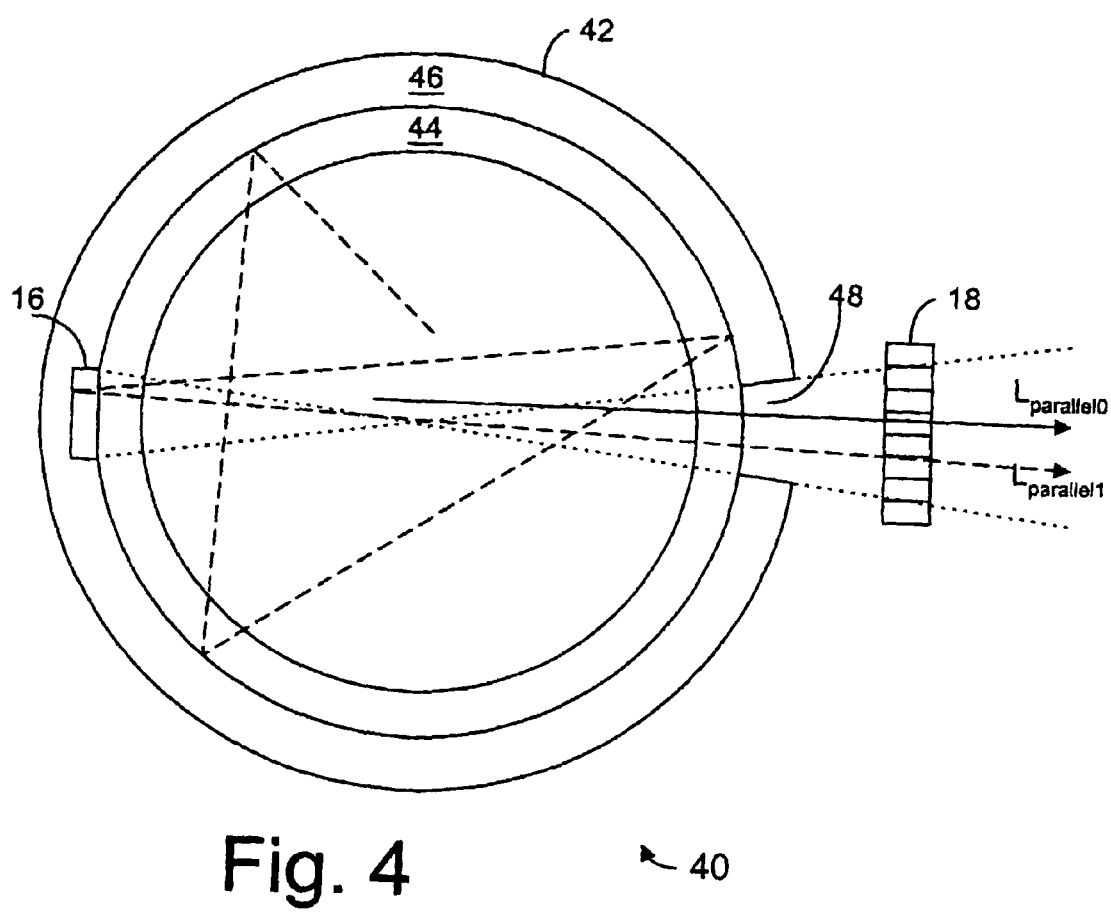

FIG. 4 shows a fourth embodiment 40 of a system utilizing this invention. It includes a radio-frequency (RF) driven plasma light source 42, such as that available from Fusion, Inc. of 7524 Standish Place, Rockville, Md., USA. The light source includes a quartz bulb 44 to which is affixed a quarter-wave phase retarder 16 and within which is a substantially spherical light cavity. In some embodiments, the quartz bulb may have a flat spot to facilitate bonding of the phase retarder. The light source also includes a specular high reflectivity ceramic coating 46 or other suitable reflector, which is advantageously deposited so as to encapsulate the bulb and the phase retarder. The reflector includes a substantially non-reflective opening 48 which may, in some embodiments, be located substantially opposite the phase retarder. The angles from the perimeter of the phase retarder to the edges of the opening define a field of vision, denoted in FIG. 4 by dotted lines. Ideally, the linear polarizer 18 should encompass this field of view. In some embodiments, the linear polarizer could be located within the opening 48.

Some of the light created by the RF-induced plasma (not shown) will escape through the opening and contact the linear polarizer. A portion of that light that is of the correct polarization will be transmitted as a first component ($L_{parallel0}$) of the output beam. The wrong-polarization portion will be reflected back into the plasma. After perhaps making some number of bounces off the reflective coating 46, the wrong polarization light may pass through the phase retarder, be reflected back through the phase retarder, pass through the opening 48, and be transmitted through the linear polarizer as a second component ($L_{parallel1}$) of the output beam.

Figure 5:
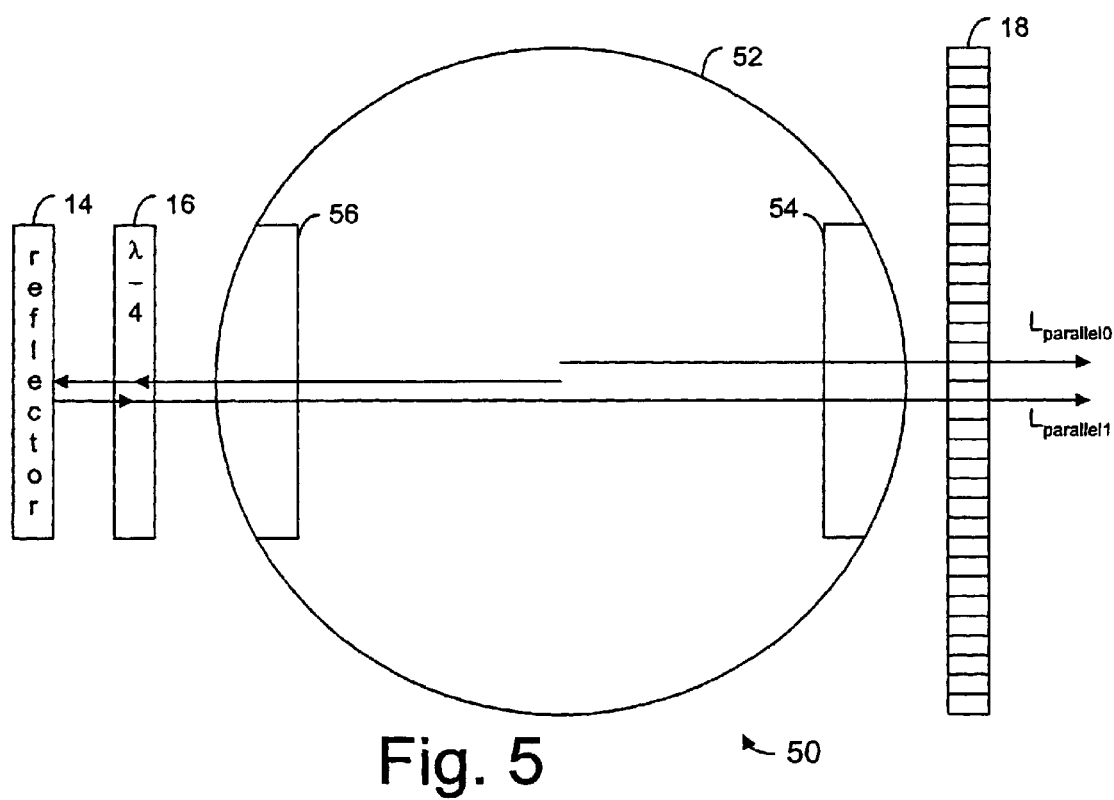

FIG. 5 shows a fifth embodiment 50 of a system similar to that of FIG. 4. The light source 52 has a reflective coating (not shown) on its interior surface, and a first 54 and a second 56 non-reflective window through which the light beam can emerge. It includes a reflector 14, quarter-wave phase retarder 16, and linear polarizer 18, which are sized appropriately. Light emerges from the first window and contacts the linear polarizer. If it happens to be of the correct polarization, it is transmitted as a first component of the output beam. Otherwise, it is reflected back through the first window, emerges from the second window, passes through the quarter-wave phase retarder, is reflected by the reflector, makes a second pass back through the quarter-wave phase retarder, passes through the second window, and emerges from the first window. This time when it encounters the linear polarizer, it is of the correct polarization, having made two passes through the quarter-wave phase retarder, and becomes a second component of the output beam.

Figure 6:
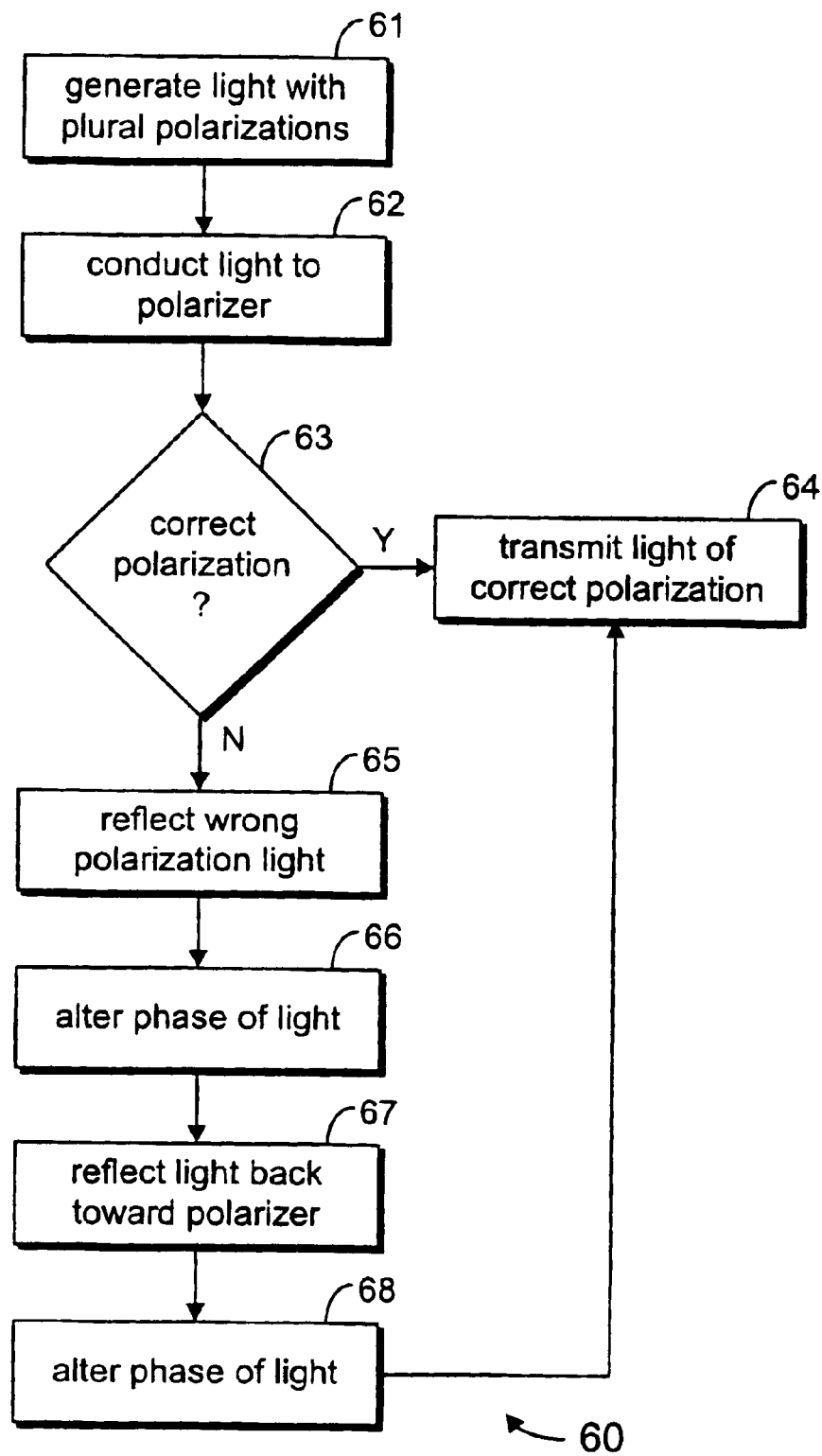
FIG. 6 shows one embodiment of a method of operation of a polarization conversion system according to this invention.

FIG. 6 illustrates one exemplary embodiment 60 of a method of operation of a polarization conversion system utilizing this invention. Light is generated (61) with plural polarizations, typically random polarization. It is conducted (62) to a polarizer. If (63) a component of the light is of the correct polarization, it is transmitted (64) as one component of an output beam. If, however, a component of the light is of the wrong polarization, it is reflected (65) for correction. In the process of correction, the phase of the light's polarization is altered (66). In embodiments, the phase-altered light is then reflected (67) back toward the polarizer. In some embodiments, its phase may again be altered (68), if that is necessary in order for it to be of the right polarization. In other embodiments, it may be possible to achieve the correct polarization in a single operation, such as by passing it through a half-wave phase retarder. If the half-wave phase retarder is only operative in a single direction, the phase-altered light may be reflected directly back through the (in this direction inert) phase retarder on its way to the polarizer. If not, it will be necessary to bypass the phase retarder such as by reflecting around it by a series of mirrors. Ultimately, the corrected-polarization light is transmitted (64) as a second component of the output beam. In other embodiments, it may be desirable to use a phase retarder which rotates the light some fraction of a phase other than one quarter or one half. In those cases, the wrong-phase light may bounce between the polarizer and the reflector several times before its polarization finally becomes correct and it emerges from the polarizer.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   a reflector;
   a light source for producing light of a first polarization and light of a second polarization;
   a linear polarizer which substantially passes light of the first polarization and substantially reflects light of the second polarization;
   a phase retarder disposed between the reflector and the linear polarizer; and
   wherein the light source is disposed between the phase retarder and the linear polarizer.

2. The apparatus of claim 1 wherein the phase retarder is mechanically coupled to the reflector and has substantially a same shape as the reflector.

3. The apparatus of claim 2 wherein the phase retarder and the reflector are substantially parabolic.

4. The apparatus of claim 1 wherein the light source comprises a substantially spherical light cavity having a reflective inner surface, and having a first window and a second window through the reflective inner surface, the first and second windows being disposed at substantially opposite sides of the light cavity.

5. The apparatus of claim 4 wherein the phase retarder and the reflector are disposed substantially in an optical path with the first window, and the linear polarizer is disposed substantially in an optical path with the second window.

6. The apparatus of claim 5 wherein the phase retarder, the reflector, and the linear polarizer are of substantially planar shape.

7. The apparatus of claim 1 wherein the light source comprises:
   an RE-driven plasma light source having a bulb, and having a reflective coating surrounding the bulb and the phase retarder.

8. A system comprising:
   a linear polarizing means for transmitting light of a first polarization and for reflecting light of a second polarization;
   phase retarder means for altering polarization of the light of the second polarization reflected from the linear polarizer means;
   reflector means for reflecting the altered polarization light from the phase retarder means back to the linear polarizer means.

* * * * *

UNITED STATES PATENT AND TRADEMARK OFFICE
CERTIFICATE OF CORRECTION

PATENT NO. : 6,811,272 B2
DATED : November 2, 2004
INVENTOR(S) : Micheal O'Connor and Clark A. Pentico It is certified that error appears in the above-identified patent and that said Letters Patent is hereby corrected as shown below:

<u>Column 4,</u>
Line 53, "RE-driven" should be -- RF-driven --.

Signed and Sealed this

Twenty-second Day of February, 2005

JON W. DUDAS
*Director of the United States Patent and Trademark Office*